(12) United States Patent
Zhang et al.

(10) Patent No.: US 9,069,910 B2
(45) Date of Patent: Jun. 30, 2015

(54) MECHANISM FOR FACILITATING DYNAMIC CANCELLATION OF SIGNAL CROSSTALK IN DIFFERENTIAL INPUT/OUTPUT CHANNELS (71) Applicants: Zhichao Zhang, Chandler, AZ (US); Khine N. Han, Phoenix, AZ (US); Kemal Aygun, Chandler, AZ (US)

(72) Inventors: Zhichao Zhang, Chandler, AZ (US); Khine N. Han, Phoenix, AZ (US); Kemal Aygun, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 13/729,246

(22) Filed: Dec. 28, 2012

(65) Prior Publication Data

US 2014/0189190 A1    Jul. 3, 2014

(51) Int. Cl.
*G06F 13/00* (2006.01)
*H04J 1/12* (2006.01)
*H04J 3/10* (2006.01)
*H01R 13/648* (2006.01)
*G06F 13/40* (2006.01)

(52) U.S. Cl.
CPC .................................. *G06F 13/4022* (2013.01)

(58) Field of Classification Search
CPC ............. H01R 13/6461; H01R 23/005; H01R 13/658; H05K 1/0228; H05K 1/0216; Y10S 439/941; G09G 2320/0209
USPC ............... 710/317; 370/201; 439/941, 607.01
See application file for complete search history.

(56) References Cited

U.S. PATENT DOCUMENTS

| 4,322,746 | A | * | 3/1982 | Oguino | ........................ 386/275 |
| 5,586,914 | A | * | 12/1996 | Foster et al. | .................. 439/676 |
| 6,232,944 | B1 | * | 5/2001 | Kumagawa et al. | ........... 345/98 |
| 6,916,209 | B1 | * | 7/2005 | Casher et al. | ................. 439/676 |
| 8,120,441 | B2 | * | 2/2012 | Hsu et al. | ........................... 333/4 |
| 2002/0149598 | A1 | * | 10/2002 | Greier et al. | .................. 345/589 |
| 2005/0246671 | A1 | * | 11/2005 | Bois et al. | ......................... 716/5 |
| 2007/0040628 | A1 | * | 2/2007 | Kanno et al. | ..................... 333/4 |
| 2007/0176708 | A1 | * | 8/2007 | Otsuka et al. | .................. 333/35 |
| 2009/0180266 | A1 | * | 7/2009 | Kirk | ............................. 361/784 |
| 2009/0286426 | A1 | * | 11/2009 | Liao et al. | ..................... 439/668 |
| 2010/0323535 | A1 | * | 12/2010 | Brolin | ............................. 439/62 |

(Continued)

FOREIGN PATENT DOCUMENTS

| CN | 103903543 | A | * | 7/2014 | ............... G09G 3/20 |
| KR | 20000001238 | A | * | 1/2000 | ............... G09G 3/36 |
| KR | 20050001323 | A | * | 1/2005 | ............. G02F 1/133 |

OTHER PUBLICATIONS

"NN920822: Global Routing Techniques for Signal Crosstalk Avoidance and Prediction", Aug. 1, 1992, IBM, IBM Technical Disclosure Bulletin, vol. 35, Iss. 3, pp. 22-28.*

Jie Chen; Yongru Gu; Parhi, K.K., "Novel FEXT Cancellation and Equalization for High Speed Ethernet Transmission," Circuits and Systems I: Regular Papers, IEEE Transactions on , vol. 56, No. 6, pp. 1272-1285, Jun. 2009.*

(Continued)

*Primary Examiner* — Faisal M Zaman
(74) *Attorney, Agent, or Firm* — Blakely, Sokoloff, Taylor & Zafman LLP (57) ABSTRACT

A mechanism is described for facilitating dynamic cancellation of signal crosstalk in input/output differential channels according to one embodiment. A method of embodiments may include detecting crosstalk between a first differential signal channel pair ("differential pair") and a second differential pair of a plurality of differential pairs at a computing system, and switching polarity relating to the first transmission links of the first differential pair to cancel out the crosstalk with the second differential pair.

18 Claims, 8 Drawing Sheets

(56) References Cited

U.S. PATENT DOCUMENTS

2011/0053431 A1*  3/2011  Bopp et al. .................... 439/676
2011/0132650 A1*  6/2011  Becker et al. ................. 174/261
2012/0161893 A1*  6/2012  Ye .................................... 333/5
2013/0139608 A1*  6/2013  Gouwens ................... 73/861.08
2014/0177150 A1*  6/2014  Oluwafemi et al. ..... 361/679.02
2014/0203417 A1*  7/2014  Altunyurt et al. ............. 257/664

OTHER PUBLICATIONS

Gi-Hong Im; Kyu-Min Kang; Cheol-Jin Park, "FEXT cancellation for twisted-pair transmission," Selected Areas in Communications, IEEE Journal on, vol. 20, No. 5, pp. 959-973, Jun. 2002.*

Shoory, A.; Rubinstein, M.; Rubinstein, A.; Rachidi, F., "Simulated NEXT and FEXT in twisted wire pair bundles," EMC Europe 2011 York, pp. 266-271, Sep. 26-30, 2011.*

* cited by examiner

MECHANISM FOR FACILITATING DYNAMIC CANCELLATION OF SIGNAL CROSSTALK IN DIFFERENTIAL INPUT/OUTPUT CHANNELS

FIELD

The present disclosure generally relates to electronic devices, and more particularly, to dynamic cancellation of signal crosstalk in differential input/output channels.

BACKGROUND

Crosstalk in computer systems' data links is well-known; however, with the rise in signaling rate requirements, mitigating such crosstalk is becoming increasingly critical. Several solutions have been proposed to reduce such crosstalk, but these conventional solutions are power-inefficient, cost-ineffective, and with other commercial limitations. For example, some conventional solutions include shrinking of form factor or increasing of pin count causing higher manufacturing costs, hardware assembly changes, and power penalties.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Embodiments facilitate reducing crosstalk in high-speed differential (HSD) serial links relating to input/output (I/O) channels or interfaces through crosstalk cancellation by polarity assignment and connection manner to achieve bandwidth expectations or demands. To avoid various problems (e.g., high cost, complex assembly setups, high power penalties, design/mechanical constraints, etc.) typically associated with conventional solutions, in one embodiment, an intentional polarity assignment-based solution is provided that is to ensure that opposite crosstalk polarities from different components are connected together to achieve at least a minimum crosstalk at the level of channels or designed within I/O channels. It is to be noted that terms like "link", "bus", "wire", "pin", "line", "cable", and "channel" may be used interchangeably throughout this document.

Embodiments provide for removal of pessimistic crosstalk corners from the random polarity and connection practice in existing design process, channel-level crosstalk cancellation through design-based cancellation scheme to enable higher data rate and bandwidth (e.g., for transfers greater than 16 Gbs). Embodiments may be provided through substrates as packages, interposers, motherboards, etc., or vertical connections, such as socket contacts, connector pins, etc., without having to require any hardware or assembly changes or incurring any additional cost or power penalties.

Figure 1A:
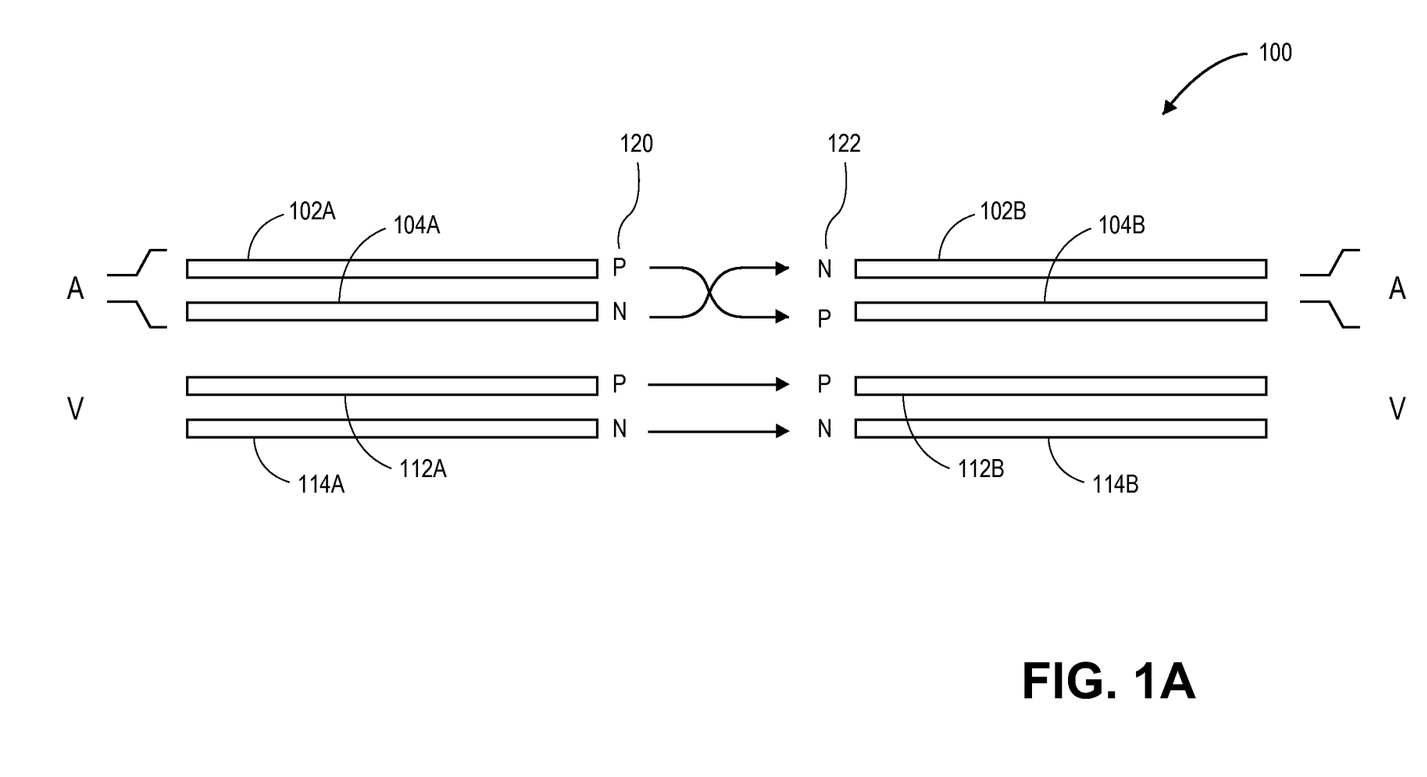
FIG. 1A illustrates a system for facilitating dynamic cancellation of crosstalk in differential input/output signal channel pairs according to one embodiment.

FIG. 1A illustrates a system 100 for facilitating dynamic cancellation of crosstalk in differential I/O signal channel pairs 102A-104A, 112A-114A according to one embodiment. As illustrated two pairs 102A-104A, 112A-114A of differential signal channels are provided where the top or first pair 102A-104A is regarded as an aggressor ("A"), while the bottom or second pair 112A-114A is regarded as the victim ("V") of the two pairs 102A-104A, 112A-114A. In the illustrated embodiment, signal bus 102A holds a positive polarity ("P" or "plus" or "+"), while signal bus 104A holds a negative polarity ("N" or "minus" or "−"). Similarly, signal bus 112A has a positive polarity associated with it, while signal bus 114A holds a negative polarity.

It is contemplated that two pairs 102A-104A, 112A-114A may run through or be part of one or more components of a printed circuit board (PCB), a package or other substrate where the crosstalk (e.g., far end crosstalk ("FEXT")) may occur. It is to be noted that terms like "FEXT" and "crosstalk" may be interchangeably used throughout this document. FEXT may be defined as the difference between the crosstalk experienced by the two buses of a differential pair, such as FEXT (differential)=FEXT (positive bus)−FEXT (negative leg).

In one embodiment, the polarities of the two aggressor signal buses 102A, 104A may be switched or altered or rearranged as indicated by signal buses 102B and 104B to reverse the polarity of the aforementioned far end crosstalk. In one embodiment, switching of the polarities (e.g., P to N, N to P) of buses 102A, 104A into the polarities of buses 102B, 104B alters the original high-crosstalk polarity sequence of P-N-P-N 120 into a sequence of N-P-P-N 122. In contrast, in some embodiments, the polarities of buses 112A, 114A of the victim pair (as opposed to those of the aggressive pair 102A-104A) may be switched to obtain a new polarity sequence of P-N-N-P (as opposed to N-P-P-N 122). The signal polarity selection for system 100 may be made to ensure that its differential far end crosstalk polarity is opposite to that of the other components (such as the adjacent ones).

In one embodiment, polarities may be switched or altered by moving or rearranging one or more pins relating to the buses of pairs A 102A-104A and V 112A-114A to achieve cancellation and/or reduction of the detected crosstalk, FEXT. Using the aforementioned equation and crosstalk's reciprocity principle, FEXT of the original, sequence P-N-

P-N 120 may equal V1(2*K2−K1−K3), while the new, polarity sequence N-P-P-N 122 may produce FEXT=−V1(2*K2−K1−K3). This means the FEXT of a same routing structure may be minimized by switching the FEXT polarity in the middle of the structure through a pin re-arrangement.

Figure 1B:
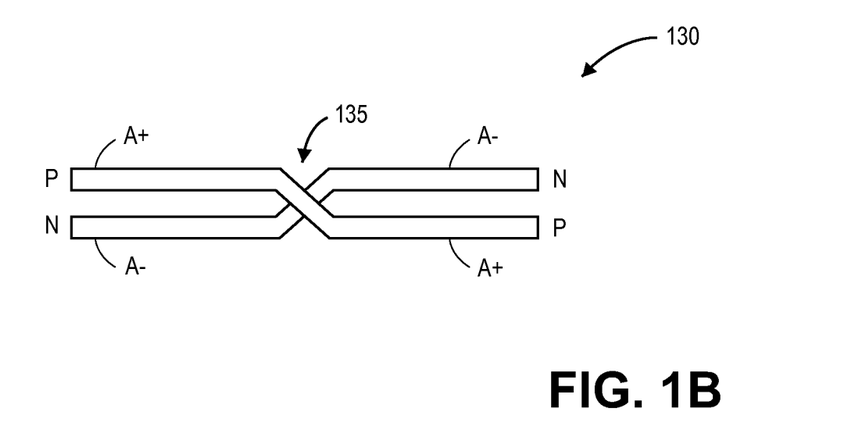
FIG. 1B illustrates crossover mechanism for polarity switching according to one embodiment.

FIG. 1B illustrates crossover mechanism 130 for polarity switching according to one embodiment. In one embodiment, transmission cables or wires representing buses may be physically crossed over 135 each other to achieve polarity switching to cancel and/or reduce any far end crosstalk between busses or transmission links. In the illustrated embodiment, the negative polarity-based bus, A− (shown at the bottom on the left) and the positive polarity-based bus, A+ (shown on the top on the left) are shown as switched-over after their wires are crossed over 135 to achieve an alternate polarity arrangement, where A− is now shown on the top and A+ is now at the bottom after being crossed over. In one embodiment, crossing over 145 may be performed at a mid-portion or any other portion that is deemed necessitated or desired.

Figure 1C:
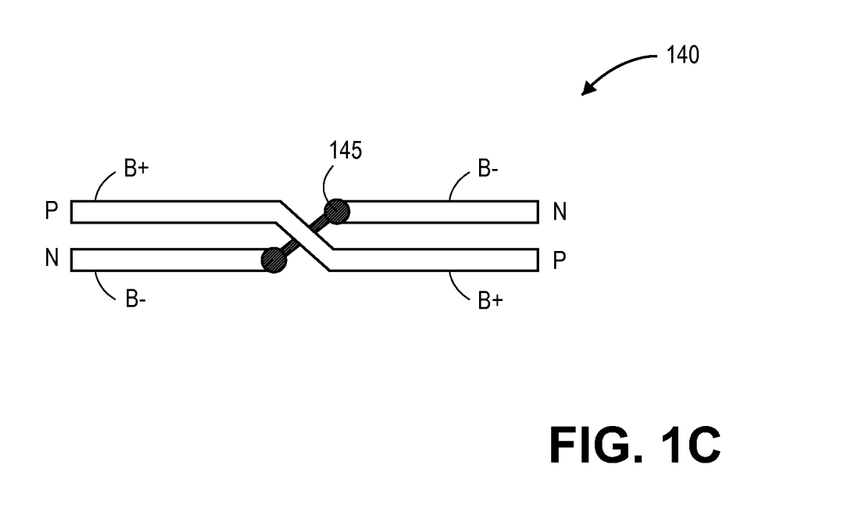
FIG. 1C illustrates transition routing mechanism for polarity switching according to one embodiment.

FIG. 1C illustrates transition routing mechanism 140 for polarity switching according to one embodiment. In one embodiment, transmission cables or wires representing buses are transitionally routed 145 to achieve polarity switching to cancel and/or reduce any far end crosstalk between busses or transmission links. In the illustrated embodiment, the negative polarity-based bus, B− (shown at the bottom on the left) and the positive polarity-based bus, B+ (shown on the top on the left) are shown as switched-over after transitionally routed 145 to achieve an alternate polarity arrangement, where A− is now shown on the top and A+ is now at the bottom after being transitionally routed. In one embodiment, transitional routing 145 may be performed at a mid-portion or any other portion that is deemed necessitated or desired.

In one embodiment, using micro-via or blind-via technology, transitional routing may be achieved by introducing and inserting a routing element 145 (e.g., via, such as a plated thru hole (PTH) via) into a cable, such as in cable B−, to achieve transitional routing of cable B−, while B+ may be bent using the crossover mechanism 130 of FIG. 1B. It is contemplated, however, that in some embodiments, both cables, such as B− and B+, of a bus pair may be transitionally routed using their own corresponding routing elements, such as routing element 145.

Figure 1D:
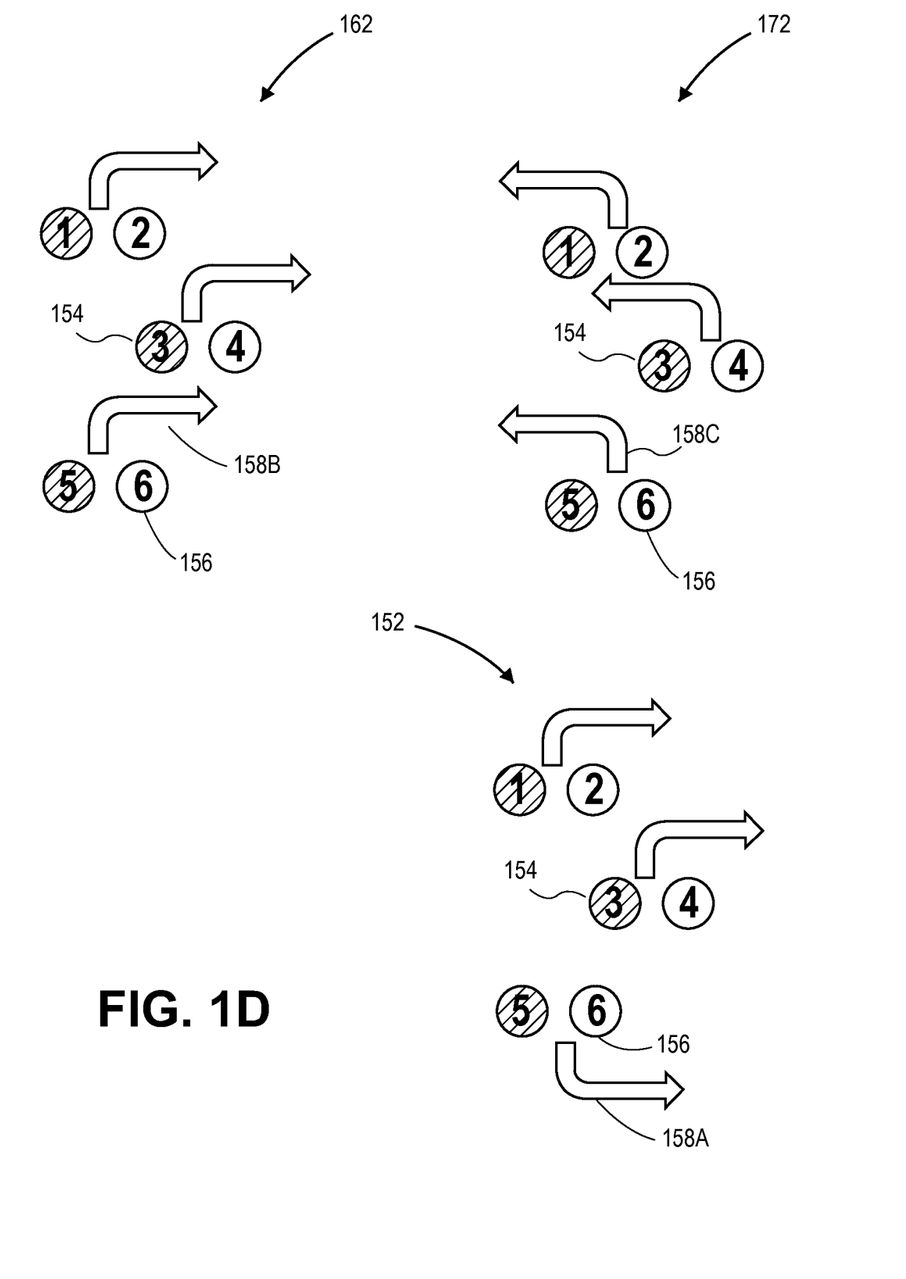
FIG. 1D illustrates the routing mechanism between vertical connections with square patterns and horizontal routing for polarity switching according to one embodiment.

FIG. 1D illustrates the routing mechanism 140 between vertical connections with square patterns and horizontal routing for polarity switching according to one embodiment. In one embodiment, polarity switching of transmission links may be performed by re-routing their cables. For example, in the illustrated embodiment, in pattern 152, various transmission links, numbered as 1-6, provide a routing order, from top to bottom, of 1, 2, 3, 4, 6 and 5.

In one embodiment, as illustrated in pattern 162, route 158A is re-routed to 158B in an order from top to bottom as 1, 2, 3, 4, 5 and 6 with the polarity of pin 5 and 6 swapped compared to pattern 152. Similarly, as illustrated in pattern 172, routes may be reversed, such as route 158C and still achieve the same result with routing order from top to bottom, shown as 2, 1, 4, 3, 6 and 5, which is essentially the same as pattern 162. The same rules may apply when routing is in other directions or when the pattern is not square (e.g., in case of a hexagonal pattern).

Figure 2A:
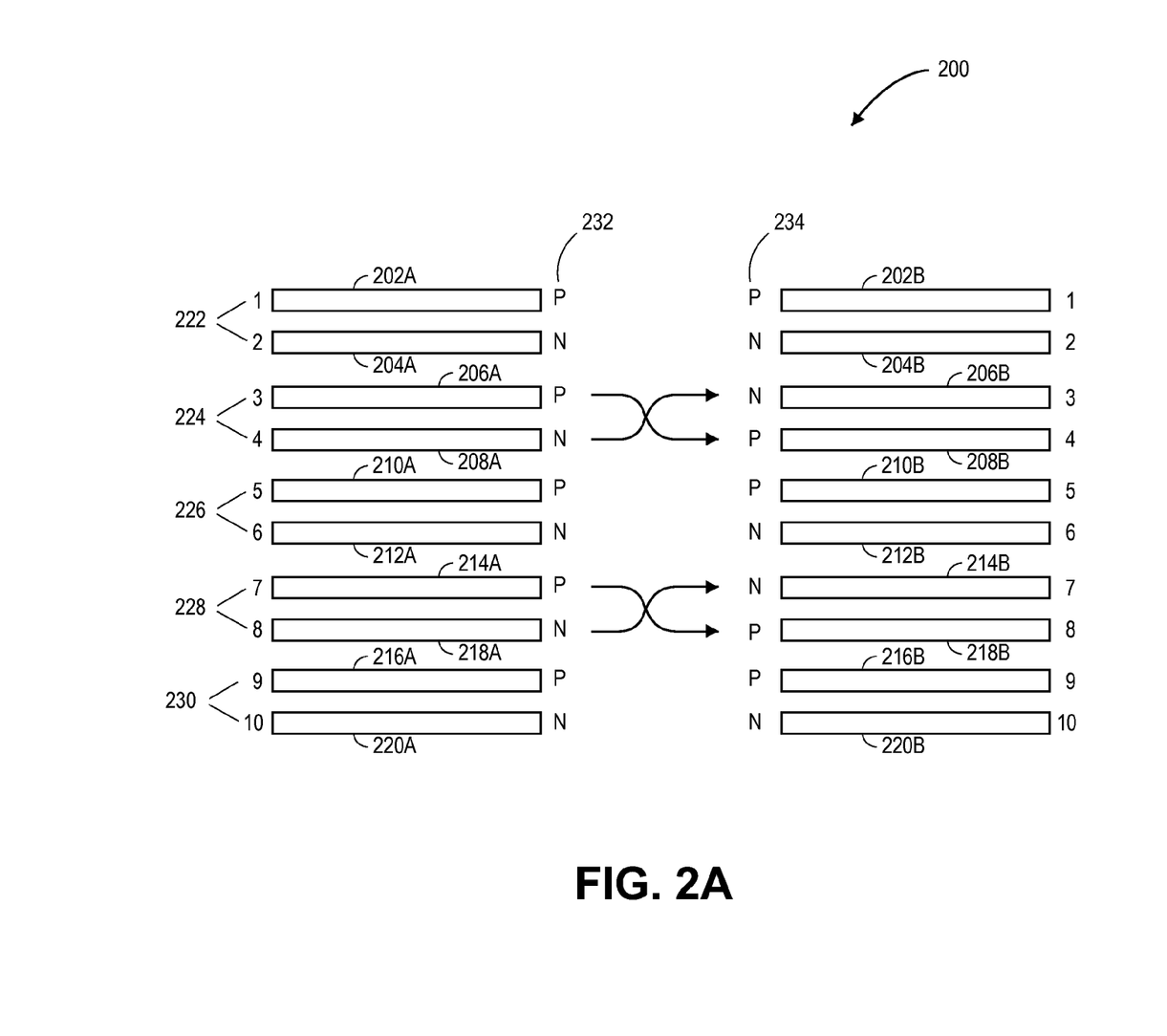
FIG. 2A illustrates a system, in another embodiment, for facilitating dynamic cancellation of crosstalk in differential input/output signal channel pairs.
Figure 2B:
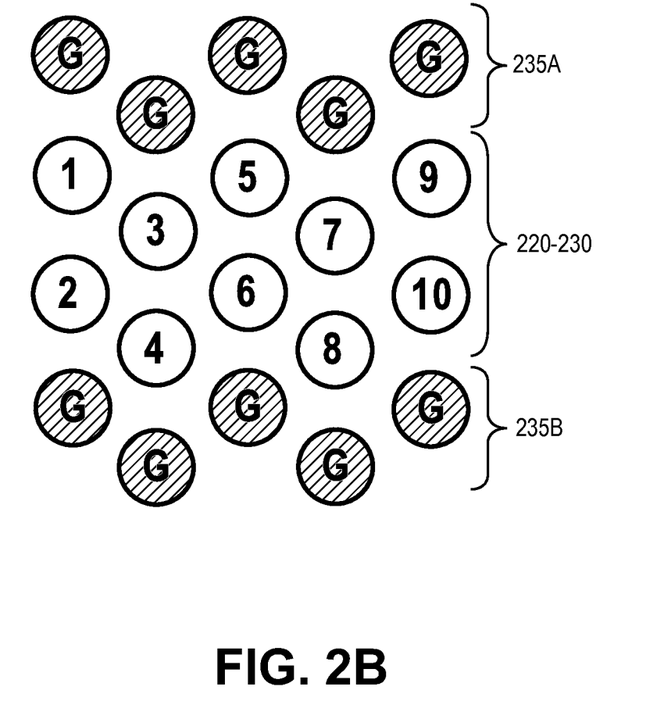
FIG. 2B illustrates the patterns of signal and ground pins in a vertical connection of the signal channel according to one embodiment.

FIG. 2A illustrates a system 200, in another embodiment, for facilitating dynamic cancellation of crosstalk in differential I/O signal channel pairs 222-230. System 200 includes a parallel pattern for differential signal pairs 222-230 that is typically used in horizontal routing in the form of transmission lines. The parallel pattern of system 200 is correspondingly reflected in FIG. 2B illustrating numbered circles 1-10 representing vertical connections with a signal-to-ground ratio (S:G) of 2:1 as sockets, vias, connectors, etc., where the two groups of "G" circles 235A, 235B represent ground. In one embodiment, the far end crosstalk polarity of a vertical connection may be determined by, for example, differential pair locations and pin polarity assignment, where the far end crosstalk polarity of a horizontal routing may be determined by, for example, design rules as spacing and line polarity assignment. For example, depending on the design rules chosen for routing and vertical transition, the polarity order for adjacent differential pairs may be chosen to be the same or opposite to achieve the crosstalk cancellation. The design practice may be more complicated for, for example, denser pin field with a higher S:G, and the same cancellation principle may be extended to any component in the channel that has an opposite crosstalk polarity.

In the illustrated embodiment, re-routing technique of FIG. 2A and/or the re-routing technique of FIG. 1C, may be applied to the various buses 202A-220A of channel pairs 222-230 to change or alter their originally-assigned polarity scheme 232 of P-N-P-N-P-N-P-N-P-N to a new polarity scheme 234 of P-N-N-P-P-N-N-P-P-N (as shown for buses 202B-220B) to reverse the far end crosstalk polarity.

Figure 2C:
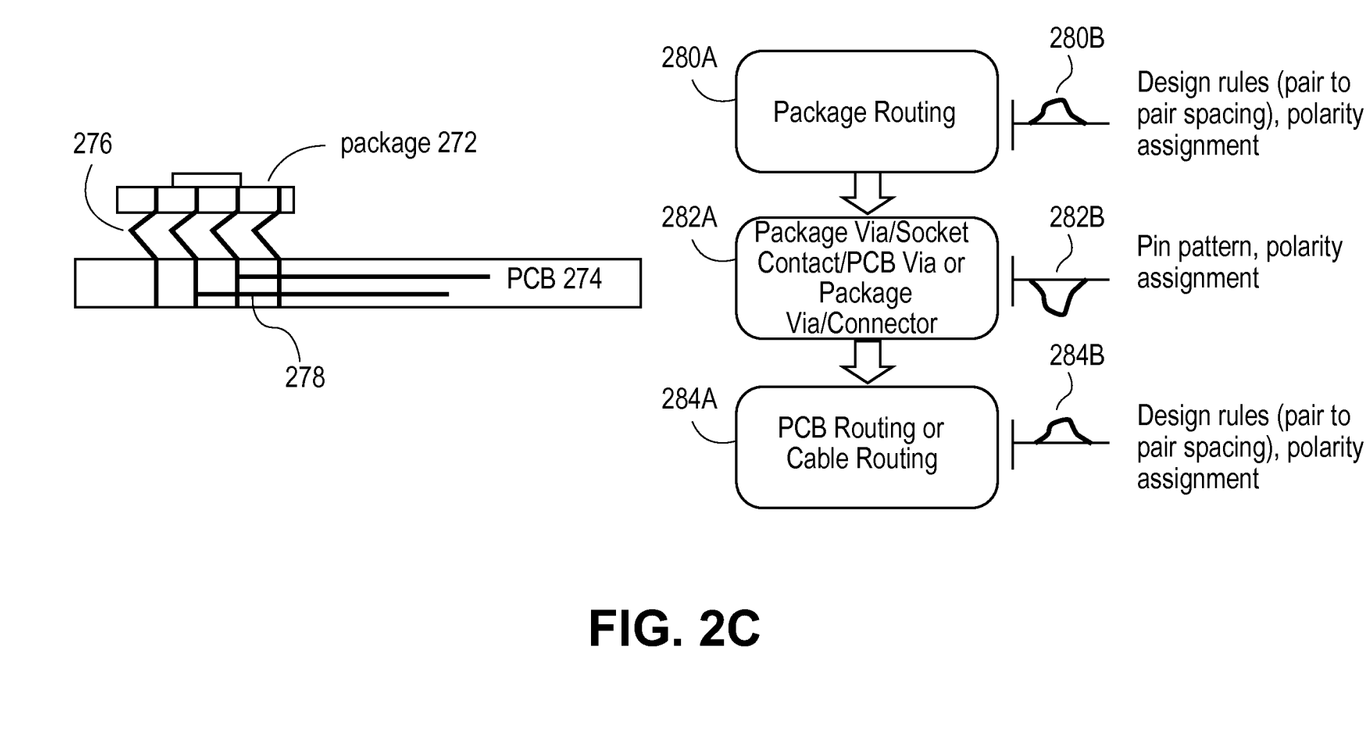
FIG. 2C illustrates channel crosstalk reduction through polarity and routing order enforcement according to one embodiment.

FIG. 2C illustrates channel crosstalk reduction through polarity and routing order enforcement according to one embodiment. In one embodiment, overall channel FEXT may be rescued by assigning polarity of and connecting various components in a manner such that the polarity of FEXT from those component may be turned opposite for achieving crosstalk cancellation. For example, depending on design rules chosen for routing and vertical transition, the polarity order for adjacent differential pairs may be chosen to be the same or opposite to achieve crosstalk cancellation. The design practice may be more complicated for, for example, denser pin field with a higher S:G ratio, and the same cancellation principle may be extended to any component in the channel that has an opposite crosstalk polarity. For example, as aforementioned, different components may be connected in a matter where their crosstalk show different polarities. In some embodiments, if order swapping may be needed, it may be used; otherwise, in some embodiments, crosstalk cancellation may be achieved without conducting any order swapping. Further, to create a particular connection style, various components may be directly routed in a particular manner, while the other way may be to add artificial swap (see FIG. 1C).

The illustrated embodiment provides a package 272 in contact with a PCB 274 via package sockets, connectors, etc., shown as channels/cables, such as vertical channels/cables 276 and horizontal channels/cables 278. In one embodiment and for example, FEXT cancellation may be achieved via package routing 280A, 280B, such as through altered design rules (e.g., pair to pair spacing) and polarity assignment. In another embodiment, pin pattern may be altered along with polarity assignment for package via/socket contact/PCB via or package via/connector 282A, 282B. In yet another embodiment, a set of design rules (e.g., pair to pair spacing) may be applied along with polarity assignment for PCB routing and/or cable routing 284A, 284B. In some embodiments, the polarity of the FEXT of each component in the channel may be turned by choosing a number of factors and solutions 282A-282B, 284A-284B, 286A-286B, such as appropriate design rules, polarity for routing, pin pattern, and/or polarity for vertical transition, etc. Furthermore, the accumulative FEXT of one or more channels may be minimized by enforcing opposite FEXT polarities from various components through polarity and/or routing.

It is contemplated that any number and type of components may be added to and/or removed from various techniques or mechanisms discussed throughout the document to facilitate various embodiments including adding, removing, and/or enhancing certain features. For brevity, clarity, and ease of understanding of dynamic cancellation of crosstalk in differential input/output channels, many of the standard and/or known components, such as those of a computing device, a testing system, a device under test (DUT), an integrated circuit, a motherboard, etc., are not shown or discussed here. It is contemplated that embodiments are not limited to any particular technology, topology, system, architecture, and/or standard and are dynamic enough to adopt and adapt to any future changes.

Figure 3:
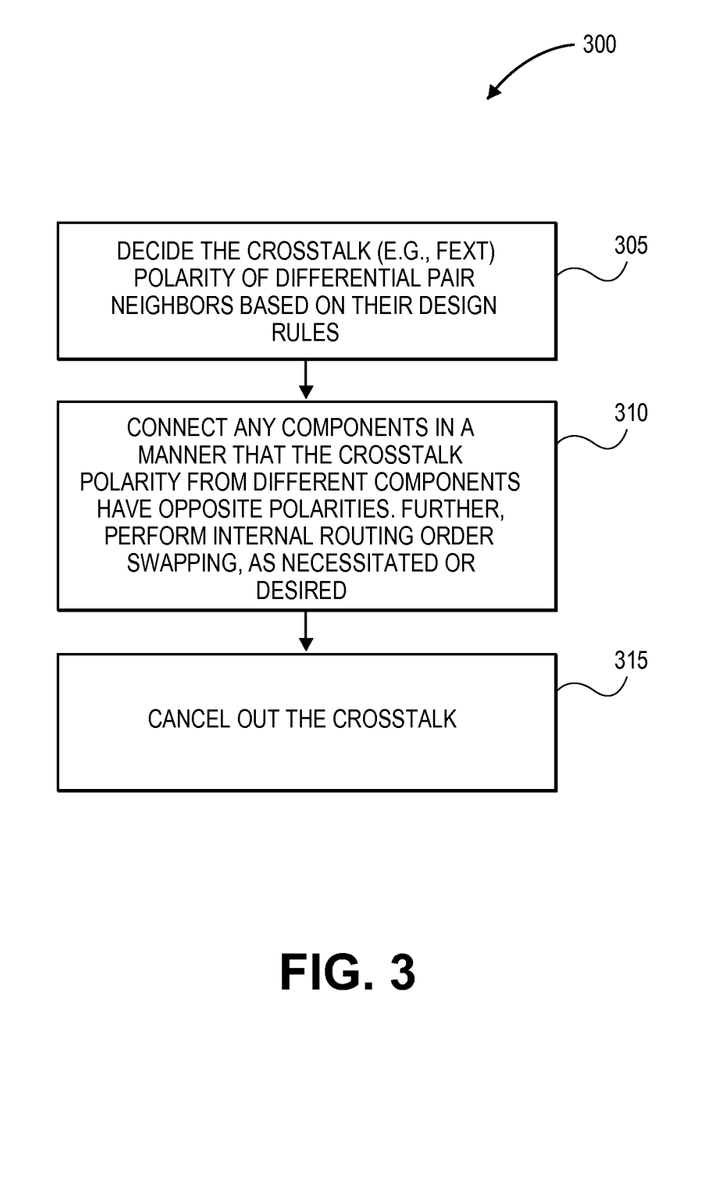
FIG. 3 illustrates a method for facilitating dynamic cancellation of crosstalk in differential input/output channels according to one embodiment.

FIG. 3 illustrates a method 300 for facilitating dynamic cancellation of crosstalk in differential input/output channels according to one embodiment. Method 300 may be performed by processing logic that may comprise mechanical components or equipment, hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by dynamic crosstalk cancellation techniques or mechanisms described with reference to the preceding Figures.

Method 300 begins at block 305 with deciding the crosstalk (e.g., FEXT) polarity of differential pair neighbors based on their design rules, where the differential pair neighbors may include a first differential signal pair and a second differential signal pair located in a PCB, a package, an integrated circuit, a connector, etc. In some embodiments, one of the differential signals pairs may be an aggressor, while the other may be a victim. At block 310, any components relating to the differential pair neighbors may be connected such that the FEXT polarity from different components may have opposite polarities. Further, a corresponding internal routing order may be swapped, as necessitated or desired, using one or more techniques (e.g., cross over, re-routing, etc.) as disclosed throughout this document. At block 315, using the aforementioned, the crosstalk is cancelled or at least reduced for the differential pair neighbors.

Figure 4:
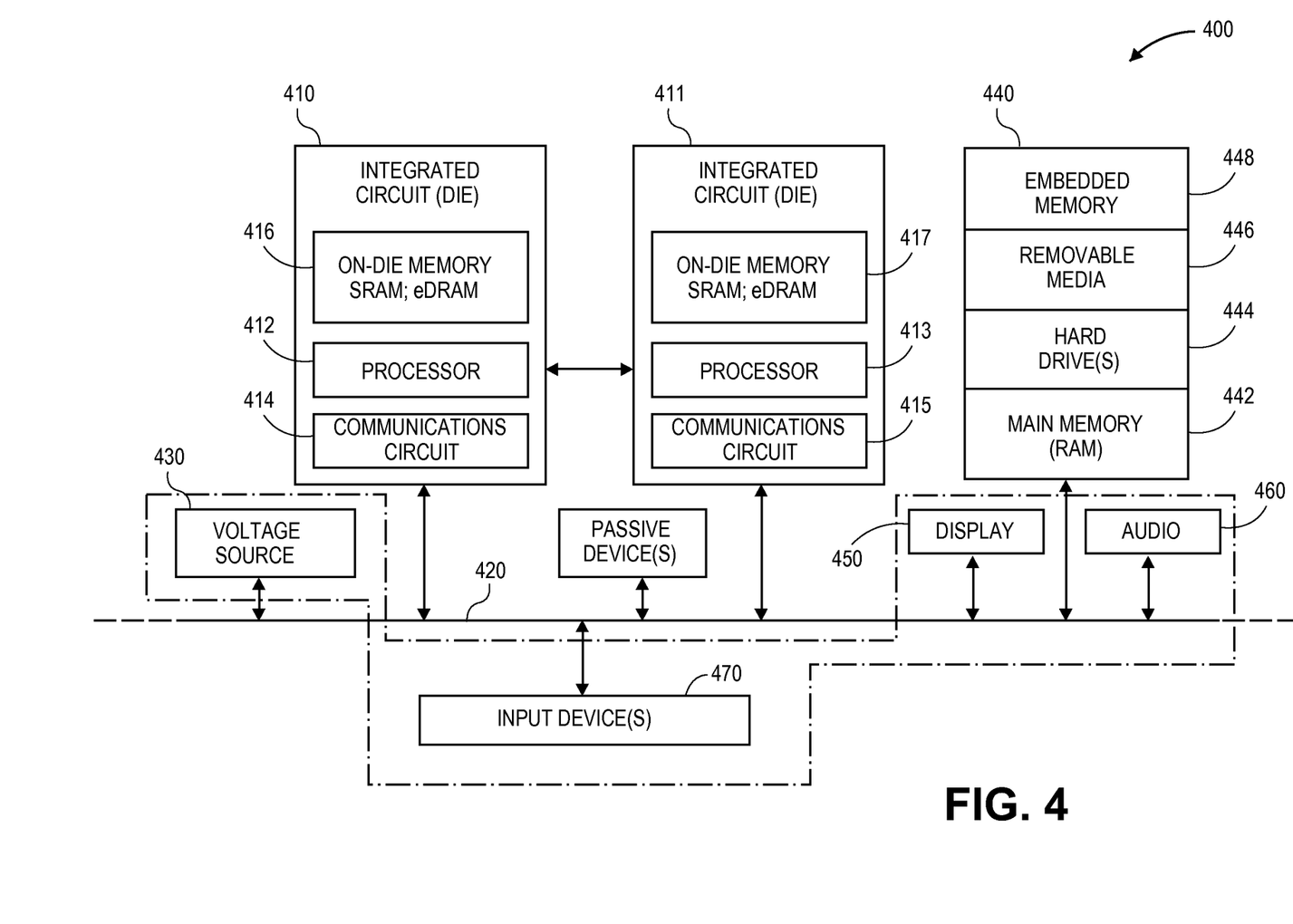
FIG. 4 illustrates one embodiment of a computer system.

FIG. 4 illustrates one embodiment of a computer system 400. The computer system 400 (also referred to as the electronic system 400) as depicted can embody any number and type of differential I/O signal pairs as well as a mechanism for facilitating dynamic cancellation of crosstalk in such differential pairs as discussed with reference to the preceding Figures throughout this document. The computer system 400 may be a mobile device such as a netbook computer. The computer system 400 may be a mobile device such as a wireless smart phone. The computer system 400 may be a desktop computer. The computer system 400 may be a handheld reader. The computer system 400 may be a server system. The computer system 400 may be a supercomputer or high-performance computing system.

In an embodiment, the electronic system 400 is a computer system that includes a system bus 420 to electrically couple the various components of the electronic system 400. The system bus 420 is a single bus or any combination of busses according to various embodiments. The electronic system 400 includes a voltage source 430 that provides power to the integrated circuits 410 and 411.

The integrated circuit 410 is electrically coupled to the system bus 420 and includes any circuit, or combination of circuits according to an embodiment. In an embodiment, the integrated circuit 410 includes a processor 412 that can be of any type. As used herein, the processor 412 may mean any type of circuit such as, but not limited to, a microprocessor, a microcontroller, a graphics processor, a digital signal processor, or another processor. In an embodiment, the processor 412 includes a thermal controller having a thermal control interface to receive test data from an automated test equipment (ATE) system and dynamically adjust a target setpoint temperature based on the data and a dynamic thermal controller to receive the target setpoint temperature from the thermal control interface and control a thermal actuator based on the target setpoint temperature as disclosed herein.

In an embodiment, SRAM embodiments are found in memory caches of the processor. Other types of circuits that can be included in the integrated circuit 410 are a custom circuit or an application-specific integrated circuit (ASIC), such as a communications circuit 414 for use in wireless devices such as cellular telephones, smart phones, pagers, portable computers, two-way radios, and similar electronic systems, or a communications circuit for servers. In an embodiment, the integrated circuit 410 includes on-die memory 416 such as static random-access memory (SRAM). In an embodiment, the integrated circuit 410 includes embedded on-die memory 416 such as embedded dynamic random-access memory (eDRAM).

In an embodiment, the integrated circuit 410 is complemented with a subsequent integrated circuit 411. Useful embodiments include a dual processor 413 and a dual communications circuit 415 and dual on-die memory 417 such as SRAM. In an embodiment, the dual integrated circuit 410 includes embedded on-die memory 417 such as eDRAM.

In an embodiment, the electronic system 400 also includes an external memory 440 that in turn may include one or more memory elements suitable to the particular application, such as a main memory 442 in the form of RAM, one or more hard drives 444, and/or one or more drives that handle removable media 446, such as diskettes, compact disks (CDs), digital variable disks (DVDs), flash memory drives, and other removable media known in the art. The external memory 440 may also be embedded memory 448 such as the first die in an embedded TSV die stack, according to an embodiment.

In an embodiment, the electronic system 400 also includes a display device 450, an audio output 460. In an embodiment, the electronic system 400 includes an input device such as a controller 470 that may be a keyboard, mouse, trackball, game controller, microphone, voice-recognition device, or any other input device that inputs information into the electronic system 400. In an embodiment, an input device 470 is a camera. In an embodiment, an input device 470 is a digital sound recorder. In an embodiment, an input device 470 is a camera and a digital sound recorder.

As shown herein, the integrated circuit 410 can be implemented in a number of different embodiments, including a test system that includes a dynamic electro-mechanical interconnect having a cavity for separating, via the cavity, a first conductor of an interconnect from a second conductor of the interconnect, and isolating, via the cavity serving as a buffer, a first electrical path provided through the first conductor from a second electrical path provided through the second conductor. The elements, materials, geometries, dimensions, and sequence of operations can all be varied to suit particular I/O coupling requirements including array contact count, array contact configuration for a microelectronic die embedded in a processor mounting substrate according to any of the several disclosed semiconductor die packaged with a thermal interface unit and their equivalents. A foundation substrate may be included, as represented by the dashed line of FIG. 4. Passive devices may also be included, as is also depicted in FIG. 4.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: detecting crosstalk between a first differential signal channel pair ("differential pair") and a second differential pair of a plurality of differential pairs at a computing system; and switching polarity relating to the first transmission links of the first differential pair to cancel out the crosstalk with the second differential pair.

Embodiments or examples include any of the above methods wherein the polarity is switched by performing one of more of switching polarity pins relating to the first transmission links, crossing over the first transmission links, swizzling one or more of the first transmission links, and re-routing one or more of the first transmission links.

Embodiments or examples include any of the above methods wherein swizzling comprises inserting a foreign routing element at a middle portion of the one or more of the first transmission links, wherein the foreign routing element includes a via having a Plated Thru Hole (PTH) via.

Embodiments or examples include any of the above methods wherein the plurality of differential pairs are located in one or more of a printed circuit board (PCB), a package, and a connector.

Embodiments or examples include any of the above methods wherein polarity relating to second transmission links of the second differential pair is switched to cancel out the crosstalk with the first differential pair.

Embodiments or examples include any of the above methods wherein the polarity is switched by performing one of more of switching polarity pins relating to the second transmission links, crossing over the second transmission links, swizzling one or more of the second transmission links, and re-routing one or more of the second transmission links.

In another embodiment or example, an apparatus comprises: a plurality of differential signal channel pairs ("differential pairs") of a computing system, wherein a first differential pair and a second differential pair of the plurality of differential pairs experience crosstalk, and wherein polarity relating to first transmission links of the first differential pair is switched to cancel out the crosstalk with the second differential pair.

Embodiments or examples include the apparatus above wherein the polarity is switched by performing one of more of switching polarity pins relating to the first transmission links, crossing over the first transmission links, swizzling one or more of the first transmission links, and re-routing one or more of the first transmission links.

Embodiments or examples include the apparatus above wherein swizzling comprises inserting a foreign routing element at a middle portion of the one or more of the first transmission links, wherein the foreign routing element includes a via having a Plated Thru Hole (PTH) via.

Embodiments or examples include the apparatus above wherein the plurality of differential pairs are located in one or more of a printed circuit board (PCB), a package, and a connector.

Embodiments or examples include the apparatus above wherein polarity relating to second transmission links of the second differential pair is switched to cancel out the crosstalk with the first differential pair.

Embodiments or examples include the apparatus above wherein the polarity is switched by performing one of more of switching polarity pins relating to the second transmission links, crossing over the second transmission links, swizzling one or more of the second transmission links, and re-routing one or more of the second transmission links.

In another embodiment or example, a system comprises: an automated test equipment (ATE) system including a computing system including a printed circuit board (PCB) having a plurality of differential signal channel pairs ("differential pairs") having a first differential pair and a second differential pair, wherein the first differential pair and the second differential pair of the plurality of differential pairs experience crosstalk, and wherein polarity relating to first transmission links of the first differential pair is switched to cancel out the crosstalk with the second differential pair.

Embodiments or examples include the system above wherein the polarity is switched by performing one of more of switching polarity pins relating to the first transmission links, crossing over the first transmission links, swizzling one or more of the first transmission links, and re-routing one or more of the first transmission links.

Embodiments or examples include the system above wherein swizzling comprises inserting a foreign routing element at a middle portion of the one or more of the first transmission links, wherein the foreign routing element includes a via having a Plated Thru Hole (PTH) via.

Embodiments or examples include the system above wherein the plurality of differential pairs are further located in a package or a connector.

Embodiments or examples include the system above wherein polarity relating to second transmission links of the second differential pair is switched to cancel out the crosstalk with the first differential pair.

Embodiments or examples include the system above wherein the polarity is switched by performing one of more of switching polarity pins relating to the second transmission links, crossing over the second transmission links, swizzling one or more of the second transmission links, and re-routing one or more of the second transmission links.

Another embodiment or example includes an apparatus performing any of the methods in the examples above In another embodiment or example, an apparatus comprises means for performing any one or more of the operations mentioned above.

In yet another embodiment or example, at least one machine-readable medium comprising a plurality of instructions that in response to being executed on a computing device, causes the computing device to carry out a method according to any one or more of the operations mentioned above.

In yet another embodiment or example, at least one non-transitory or tangible machine-readable comprising a plurality of instructions that in response to being executed on a computing device, causes the computing device to carry out a method according to any one or more of the operations mentioned above.

In yet another embodiment or example, a computing device arranged to perform a method according to any one or more of the operations mentioned above.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a plurality of differential signal channel pairs ("differential pairs") of a computing system, wherein a first differential pair and a second differential pair of the plurality of differential pairs experience crosstalk; and
   logic to manipulate polarity relating to at least one of first transmission links of the first differential pair and second transmission links of the second differential pair such that the polarity is switched to cancel out the crosstalk between the first differential pair and the second differential pair, wherein switching includes re-routing one or more of the first and second transmission links based on designs of the first and second differential pairs, wherein re-routing is performed via a parallel pattern re-routing scheme such that a first far-end crosstalk polarity of a vertical connection is determined by at least one of locations of the first and second differential pairs and pin polarity assignments of the first and second differential pairs, and a second far-end crosstalk polarity of a horizontal routing is determined by at least one of design rules and line polarity rules associated with the first and second differential pairs.

2. The apparatus of claim 1, wherein switching further comprises one of more of switching polarity pins relating to at least one of the first transmission links and the second transmission links, crossing over at least one of the first transmission links and the second transmission links, and swizzling at least one of the first transmission links and the second transmission links.

3. The apparatus of claim 2, wherein swizzling comprises inserting a foreign routing element at a middle portion of at least one of the first transmission links and the second transmission links, wherein the foreign routing element includes a via having a Plated Thru Hole (PTH) via.

4. The apparatus of claim 1, wherein the plurality of differential pairs are located in one or more of a printed circuit board (PCB), a package, and a connector.

5. The apparatus of claim 1, wherein the polarity relating to the second transmission links of the second differential pair is switched to cancel out the crosstalk between the first differential pair and the second differential pair, and wherein the polarity relating to the first transmission links of the first differential pair is switched to cancel out the crosstalk between the first differential pair and the second differential pair.

6. The apparatus of claim 5, wherein the polarity is switched by performing one of more of switching polarity pins relating to at least one of the first transmission links and the second transmission links, crossing over at least one of the first transmission links and the second transmission links, and swizzling at least one of the first transmission links and of the second transmission links.

7. A system comprising:
   a computing system including a printed circuit board (PCB) having a plurality of differential signal channel pairs ("differential pairs") having a first differential pair and a second differential pair, wherein the first differential pair and the second differential pair of the plurality of differential pairs experience crosstalk, and
   wherein polarity relating to at least one of first transmission links of the first differential pair and second transmission links of the second differential pair such that the polarity is switched to cancel out the crosstalk between the first differential pair and the second differential pair, wherein switching includes re-routing one or more of the first and second transmission links based on designs of the first and second differential pairs, wherein re-routing is performed via a parallel pattern re-routing scheme such that a first far-end crosstalk polarity of a vertical connection is determined by at least one of locations of the first and second differential pairs and pin polarity assignments of the first and second differential pairs, and a second far-end crosstalk polarity of a horizontal routing is determined by at least one of design rules and line polarity rules associated with the first and second differential pairs.

8. The system of claim 7, wherein switching further comprises one of more of switching polarity pins relating to at least one of the first transmission links and the second transmission links, crossing over the first transmission links and the second transmission links, and swizzling at least one of the first transmission links and the second transmission links.

9. The system of claim 8, wherein swizzling comprises inserting a foreign routing element at a middle portion of at least one of the first transmission links and the second transmission links, wherein the foreign routing element includes a via having a Plated Thru Hole (PTH) via.

10. The system of claim 7, wherein the plurality of differential pairs are further located in a package or a connector.

11. The system of claim 7, wherein the polarity relating to the second transmission links of the second differential pair is switched to cancel out the crosstalk between the first differential pair and the second differential pair, and wherein the polarity relating to the first transmission links of the first differential pair is switched to cancel out the crosstalk between the first differential pair and the second differential pair.

12. The system of claim 11, wherein the polarity is switched by performing one of more of switching polarity pins relating to at least one of the first transmission links and the second transmission links, crossing over at least one of the first transmission links and the second transmission links, and swizzling at least one of the first transmission links and one or more of the second transmission links.

13. A method comprising:
detecting crosstalk between a first differential signal channel pair ("differential pair") and a second differential pair of a plurality of differential pairs at a computing system; and
manipulate polarity relating to at least one of the first transmission links of the first differential pair and second transmission links of the second differential pair such that the polarity is switched to cancel out the crosstalk between the first differential pair and the second differential pair, wherein switching includes re-routing one or more of the first and second transmission links based on designs of the first and second differential pairs, wherein re-routing is performed via a parallel pattern re-routing scheme such that a first far-end crosstalk polarity of a vertical connection is determined by at least one of locations of the first and second differential pairs and pin polarity assignments of the first and second differential pairs, and a second far-end crosstalk polarity of a horizontal routing is determined by at least one of design rules and line polarity rules associated with the first and second differential pairs.

14. The method of claim 13, wherein switching further comprises one of more of switching polarity pins relating to at least one of the first transmission links and the second transmission links, crossing over the first transmission links and the second transmission links, and swizzling at least one of the first transmission links and the second transmission links.

15. The method of claim 14, wherein swizzling comprises inserting a foreign routing element at a middle portion of at least one of the first transmission links and the second transmission links, wherein the foreign routing element includes a via having a Plated Thru Hole (PTH) via.

16. The method of claim 13, wherein the plurality of differential pairs are located in one or more of a printed circuit board (PCB), a package, and a connector.

17. The method of claim 13, wherein the polarity relating to the second transmission links of the second differential pair is switched to cancel out the crosstalk between the first differential pair and the second differential pair, and wherein the polarity relating to the first transmission links of the first differential pair is switched to cancel out the crosstalk between the first differential pair and the second differential pair.

18. The method of claim 17, wherein the polarity is switched by performing one of more of switching polarity pins relating to at least one of the first transmission links and the second transmission links, crossing over at least one of the first transmission links and the second transmission links, and swizzling at least one of the first transmission links and of the second transmission links.

* * * * *